(12) United States Patent
Bigelow

(10) Patent No.: US 9,463,883 B2
(45) Date of Patent: Oct. 11, 2016

(54) SPACECRAFT CAPTURE TUG

(71) Applicant: Bigelow Aerospace LLC, Las Vegas, NV (US)

(72) Inventor: Robert T. Bigelow, Las Vegas, NV (US)

(73) Assignee: Bigelow Aerospace, LLC, North Las Vegas, NV (US)

( * ) Notice: Subject to any disclaimer, the term of this patent is extended or adjusted under 35 U.S.C. 154(b) by 187 days.

(21) Appl. No.: 14/121,324

(22) Filed: Aug. 20, 2014

(65) Prior Publication Data

US 2015/0053823 A1  Feb. 26, 2015

Related U.S. Application Data

(60) Provisional application No. 61/959,449, filed on Aug. 22, 2013.

(51) Int. Cl.
| | | |
|---|---|---|
| *B64G 1/64* | (2006.01) | |
| *B64G 1/40* | (2006.01) | |
| *B64G 1/42* | (2006.01) | |
| *B64G 1/44* | (2006.01) | |
| *B64G 1/12* | (2006.01) | |
| *B64G 1/26* | (2006.01) | |

(52) U.S. Cl.
CPC .............. *B64G 1/646* (2013.01); *B64G 1/401* (2013.01); *B64G 1/402* (2013.01); *B64G 1/425* (2013.01); *B64G 1/44* (2013.01); *B64G 1/648* (2013.01); *B64G 1/12* (2013.01); *B64G 1/26* (2013.01)

(58) Field of Classification Search
CPC ............ B64G 1/64; B64G 1/22; B64G 1/40; B64G 1/00; B64G 1/646; B64G 1/42; B64G 1/443; B64G 1/401
See application file for complete search history.

(56) References Cited

U.S. PATENT DOCUMENTS

| | | | | |
|---|---|---|---|---|
| 3,891,160 A | * | 6/1975 | Minovitch | B64G 1/007 244/171.1 |
| 4,664,343 A | * | 5/1987 | Lofts | B64G 1/007 244/171.1 |
| 4,834,325 A | * | 5/1989 | Faget | B64G 1/12 136/245 |
| 4,964,596 A | * | 10/1990 | Ganssle | B64G 1/646 244/172.5 |
| 5,372,340 A | * | 12/1994 | Ihara | B64G 4/00 244/172.5 |
| 5,429,328 A | * | 7/1995 | Dobbs | B64G 1/646 244/172.5 |
| 5,511,748 A | * | 4/1996 | Scott | B64G 1/1078 244/172.5 |
| 5,779,195 A | * | 7/1998 | Basuthakur | B64G 1/007 244/173.1 |
| 6,017,000 A | * | 1/2000 | Scott | B64G 1/36 244/158.6 |
| 6,177,629 B1 | * | 1/2001 | Katz | B64G 1/428 136/244 |
| 6,523,784 B2 | * | 2/2003 | Steinsiek | B64G 1/1078 244/172.4 |
| 7,207,525 B2 | * | 4/2007 | Bischof | B25J 15/10 244/158.2 |
| 7,575,200 B2 | * | 8/2009 | Behrens | B64G 1/1078 244/172.3 |
| 7,861,975 B2 | * | 1/2011 | Behrens | B64G 1/1078 244/158.1 |

(Continued)

*Primary Examiner* — Justin Benedik
(74) *Attorney, Agent, or Firm* — Gbbs & White P.C.; Franklin E. Gibbs

(57) ABSTRACT

A spacecraft capture tug is disclosed. The tug can capture objects in space, including spacecraft and satellites, using an engagement system and provide propulsion for the object to a point of servicing, repair, or other desired operations. Further, the tug may dock with other specialty tugs to form a custom transport system.

2 Claims, 3 Drawing Sheets

(56) References Cited

U.S. PATENT DOCUMENTS

| | | | | |
|---|---|---|---|---|
| 2003/0164428 A1* | 9/2003 | Anderman | | B64G 1/007 244/172.4 |
| 2004/0026571 A1* | 2/2004 | Scott | | B64G 1/007 244/172.5 |
| 2004/0031885 A1* | 2/2004 | D'Ausilio | | B64G 1/1078 244/172.5 |
| 2004/0245407 A1* | 12/2004 | D'Ausilio | | B64G 1/007 244/158.5 |
| 2005/0151022 A1* | 7/2005 | D'Ausilio | | B64G 1/007 244/171.1 |
| 2006/0278765 A1* | 12/2006 | Strack | | B64G 1/646 244/172.4 |
| 2007/0040067 A1* | 2/2007 | D'Ausilio | | B64G 1/007 244/172.5 |
| 2007/0228220 A1* | 10/2007 | Behrens | | B64G 1/1078 244/172.5 |
| 2008/0121759 A1* | 5/2008 | Behrens | | B64G 1/1078 244/172.3 |
| 2015/0008288 A1* | 1/2015 | Bigelow | | B64G 1/1078 244/171.1 |
| 2015/0008289 A1* | 1/2015 | Bigelow | | B64G 1/401 244/171.2 |
| 2015/0008290 A1* | 1/2015 | Bigelow | | B64G 1/646 244/172.4 |

* cited by examiner

SPACECRAFT CAPTURE TUG

RELATED APPLICATIONS

This application claims priority under 35 U.S.C. §119 to U.S. Provisional Application No. 61/959,449 filed on Aug. 22, 2013, the contents of which are incorporated herein by reference in its entirety.

FIELD OF THE INVENTION

This invention generally relates to space vehicles that can operate as space tugs for other spacecraft and in particular to a tug that can capture an object in space such as a spacecraft or satellite.

BACKGROUND OF THE INVENTION

Space exploration is a rapidly developing field. The types of spacecraft cover a vast range including manned hard shelled space stations, space shuttles, and satellites—to name a few. These crafts usually provide invaluable information and services. However, the fact that these devices are operating in the generally inhospitable environment of space incorporates a unique set of issues. One such issue is a lack of the ability to capture a craft for repair or transport in space.

Many spacecraft are deployed to an orbital trajectory or a geostationary orbit. Satellites are an example of such crafts in space. While certain satellites could be captured and repaired by vehicles such as the Space Shuttle, these operations are expensive and limited to on site repairs or return to Earth. What is needed is a Spacecraft Capture Tug (SCT) to engage a craft in space for the purposes of moving or assisting in repairs.

One aspect of a SCT according to the present invention is the use of an engagement system. In one embodiment the engagement system is designed around a universal engagement system that will allow the vehicle to capture various objects from disabled spacecraft to man-made satellites to small asteroids etc. The vehicle will then return the captured object to a designated location in space for further actions, such as EVA servicing of a satellite at a space station. In one embodiment the engagement system will utilize two grapple arms with multiple joints to allow for a full range of motion and the grasping of a relatively close object. The forward end of one embodiment of an SCT will consist of the universal engagement system and associated avionics. In another embodiment, the engagement system is estimated to represent 10% to 15% of the vehicles total mass. The rest of the SCT will consist of standard propulsion and avionics system elements. The aft end of the SCT will have a docking adapter to allow other specialized Tugs to be attached as needed. The SCT is designed with generic capabilities to handle multiple missions.

SUMMARY OF THE INVENTION

A spacecraft capture tug is disclosed. The tug has a frame having a first and second ends, an outer periphery, and a substantially hollow interior. There is a docking adapter disposed on the second end of the frame and an engagement system disposed on the first end of the frame.

There is a plurality of chemical tanks disposed within the frame. At least one tank is comprised of an oxidizer and one tank is comprised of a propellant and each tank has an access valve for refueling in space and each tank is removably secured to the frame such that a tank can be replaced in space.

A plurality of nozzles is disposed on the outer periphery of the frame and each nozzle has a valve for regulating the flow of the oxidizer and fuel from the tanks. The number and disposition of the nozzles can be chosen for a desired execution of orienting and propelling the tug in space.

A plurality of solar cell arrays is disposed on the outer periphery of the frame and each solar cell array has a positioning system such that each array is independently pivotal in relation to the frame. There is also at least one battery and a wireless communications system connected to the batteries.

A computer is connected to the at least one battery, the nozzle valves, the positioning system of the solar cell arrays, the solar cell arrays, the communications system, and the computer controls charging of the batteries by the solar cell arrays. The computer also directs the flow of the oxidizer and fuel to each nozzle, controls ignition of the oxidizer and fuel combination, controls the positioning of the solar cell arrays, operates the communications system, executes avionics software, provides a status of the tug including the level of oxidizer and fuel in the tanks, operates the docking adapter and the engagement system, and implements a three axis attitude control.

In operation in one embodiment, power is provided to the space tug by the solar cell arrays and the computer can be accessed through a wireless communications so that the tug can be moved to a desired location in space and capture other space objects including spacecraft by way of an engagement system and provide propulsion to the captured objects.

BRIEF DESCRIPTION OF THE DRAWINGS

The invention is generally shown by way of reference to the accompanying drawings in which.

DETAILED DESCRIPTION OF THE INVENTION

Figure 1:
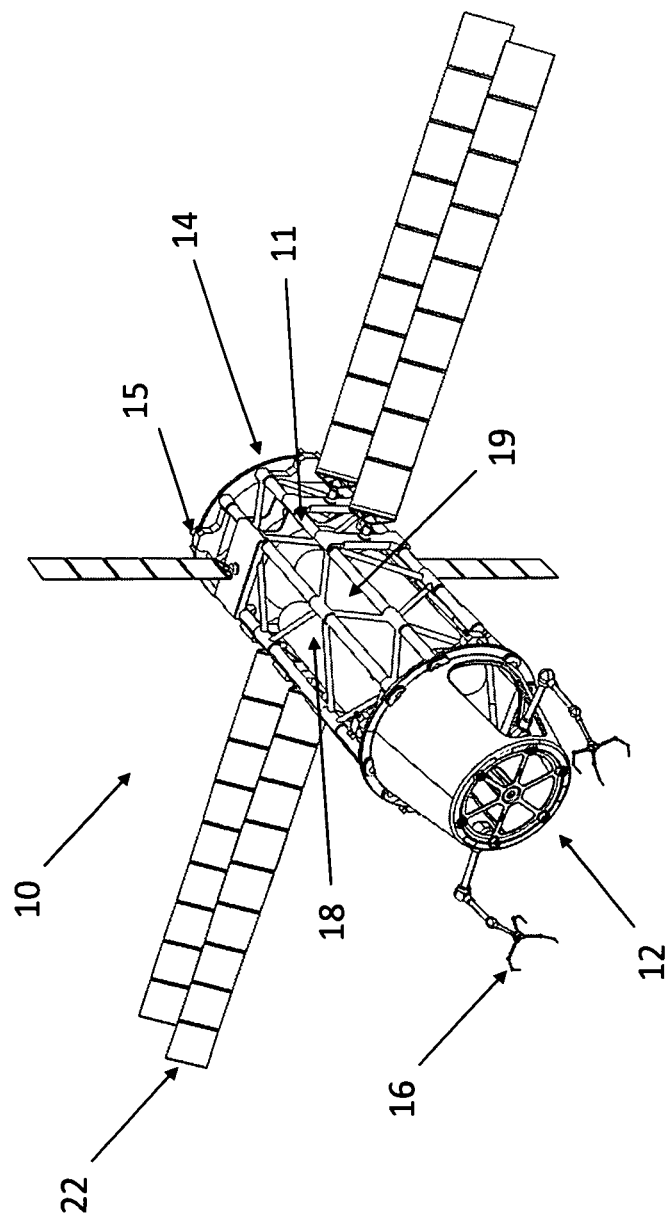
FIG. 1 is a perspective side view of the spacecraft capture tug showing the front end of the tug.

FIG. 1 perspective side view of one embodiment of a spacecraft capture tug 10. There is a frame 11 having a first 12 end and a second 14 end, an outer periphery, and a substantially hollow interior. An engagement system 16 is disposed on the first end 12 of the frame. In one embodiment, the engagement system 16 can be a plurality of robotic arms that can be used to capture other spacecraft or objects in space. In another embodiment, the engagement system can be a generic engagement system including magnetic engagement members. In another embodiment, the engagement system could be clamps. In yet another embodiment, the engagement system can include claw type structures.

Once the engagement system attached to an object, the tug could move the object to a desired location. The location could be a repair facility as for repairing satellites, or a research facility for analyzing meteoroids or even asteroids.

A plurality of chemical tanks are disposed within the frame, at least one tank comprised of an oxidizer 18 and one tank comprised of a propellant 19, each tank having an access valve for refueling in space. In one embodiment, each tank can be removed and replaced in space. However, the invention is not limited to refueling or replacing tanks. In one embodiment, the standard transit tug may be discarded after use. In another embodiment, the tanks may have a measure of protection afforded by meteor shielding disposed over the surface of the tug.

There are a number of nozzles 15 disposed on the outer periphery of the frame. Each nozzle has a valve for regulating the flow of the oxidizer and fuel from the tanks. Depending upon the application, the number and disposition of the nozzles can be chosen for a desired execution of orienting and propelling the tug in space. Some nozzles may be chosen for positioning of the tug while others may be robust enough for providing a large amount of thrust for extended periods. In one embodiment, a nozzle may be directionally swiveled to point in a variety of directions in operation.

A plurality of solar cell arrays 22 are disposed on the outer periphery of the frame and each solar cell array is independently pivotal in relation to the frame. The solar cells would provide power to the tug. The pivoting feature allows the arrays to be directed toward the Sun for optimum production of electricity. The movement of the arrays in relation to the frame is directed by a positioning system. The power from the panels can be used to charge a number of batteries. Also present is a wireless communications system connected to the batteries and a computer. The wireless communication system includes a transmitter and receiver. The computer is connected to the batteries, the nozzle valves, the positioning system of the solar cell arrays, the solar cell arrays, the communications system, and the computer controls charging of the batteries by the solar cell arrays, directs the flow of the oxidizer and fuel to each nozzle, controls ignition of the oxidizer and fuel combination, controls the positioning of the solar cell arrays, operates the communications system, executes avionics software, provides a status of the tug including the level of oxidizer and fuel in the tanks, operates the docking adapter, operates the engagement system, and implements a three axis attitude control.

In another embodiment, the tug may include sensing elements to detect the position of a spacecraft and transmitting that information to the operator. The tug could then provide data important to capture a spacecraft.

The power is provided to the space tug by the solar cell arrays and the computer can be accessed through a wireless communications so that the tug can be moved to a desired location in space and attached by way of a docking adapter to another craft and provide propulsion to the craft.

In one embodiment, the tug may contain a cable running substantially the length of the tug that could be attached at one end to a manned spacecraft and at the other to another tug that would have large solar panels to provide power to the spacecraft. The tug with the large panels would operate as a solar generator tug. Thus, the power from the solar generator tug could be directed through the cable and to the spacecraft. This flexibility allows the spacecraft capture tug to operate with other specialty tugs to fashion a custom transport vehicle system. The cable could be constructed such that it would be automatically connected and disconnected to other tugs or spacecraft.

In another embodiment, there is a communications and data cable running substantially the length of the tug that could be attached at one end to a spacecraft and at the other to another tug such as a solar generator tug to allow transmission of data to the spacecraft. The cable could be constructed such that it would be automatically connected and disconnected to other tugs or spacecraft.

The tug may be constructed to a variety of scales. For example, in one embodiment a tug may be designed to attach to large spacecraft or masses such as asteroids. In another embodiment, the tug may be tailored to smaller space objects such as small satellites.

Figure 2:
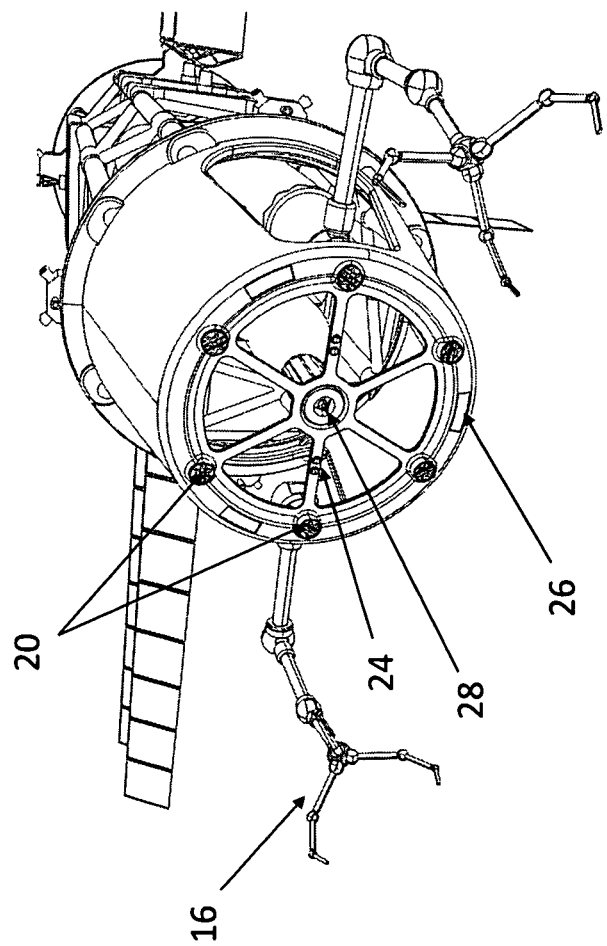
FIG. 2 is a perspective side view of the first end of the spacecraft capture tug.

FIG. 2 is a closer view of the first end 12 with the engagement system 16. There are LED lights 20 and a sensor array 26 identified. The LED lights 20 can provide lighting for cameras 24. The cameras 24 relay information by transmitter to an operator who could then arrange the Tug to best effectuate capture of another craft. The sensor array 26 can include radar imaging to determine the distance to the craft to be captured. The distance information could be transmitted to an operator. In other embodiments, the array 26 could be a laser distance measuring device.

In one embodiment, there is a harpoon like gun 28. The harpoon like gun 28 can be used to launch an attachment end to secure to a spacecraft or other object. There is a cord or rope or chain like structure attached at one end to the attachment end and at the other end to the tug. Attachment to another craft can be accomplished by magnetic means. In another embodiment, attachment can be accomplished by mechanical attachments. A motor could be used on the tug to draw the tug and the spacecraft or object closer in proximity. Once close enough, the engagement system could be used. However, there may be cases where it would be desirable to use just the harpoon like attachment means alone.

Figure 3:
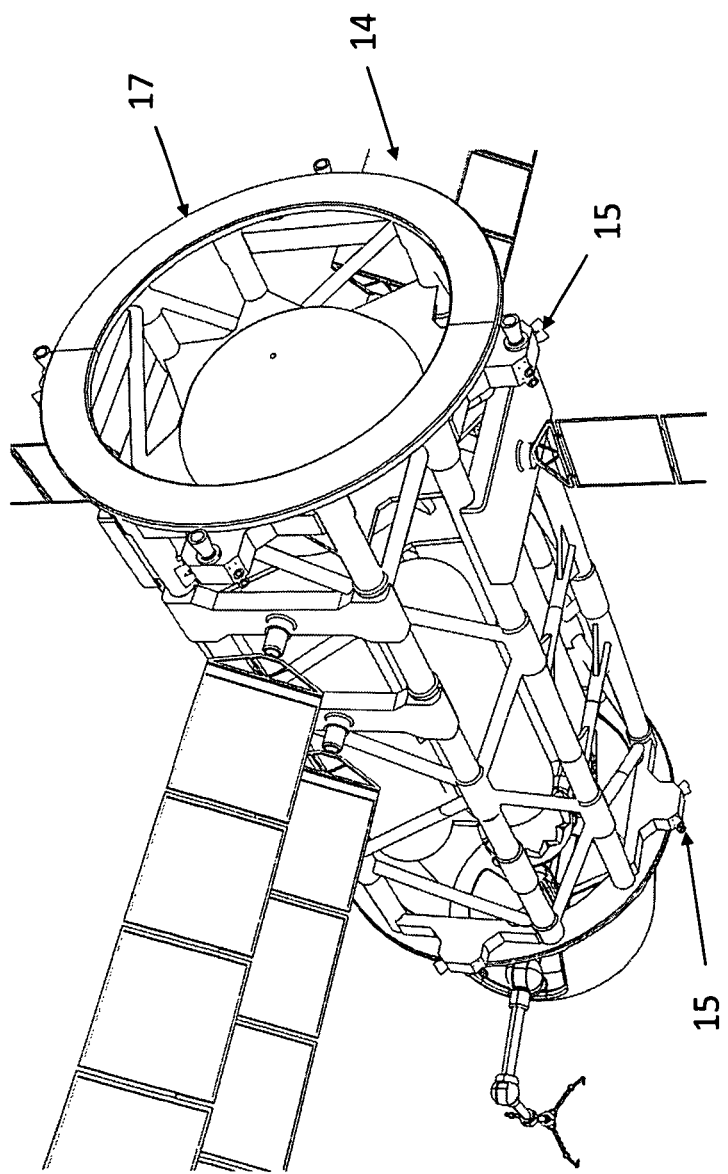
FIG. 3 is a perspective back view of the spacecraft capture tug.

FIG. 3 identifies a docking adapter 17 on the second end 14. The adapter can be generic type of adapter for use with adapters on manned spacecraft. The adapters are also used to connect two tugs together. In this fashion various types of tugs can be connected in series. For example, there could be capture tug 10 attached to a tug that provides electrical power through large solar panels to form a series of two tugs. This series could then be docked to a manned spacecraft. However, the invention is not limited to combining only two tugs and can be expanded from a single tug to more than two tugs to other combinations.

While embodiments have been described in detail, it should be appreciated that various modifications and/or variations may be made without departing from the scope or spirit of the invention. In this regard it is important to note that practicing the invention is not limited to the applications described herein. Many other applications and/or alterations may be utilized provided that such other applications and/or alterations do not depart from the intended purpose of the invention. Also, features illustrated or described as part of one embodiment may be used in another embodiment to provide yet another embodiment such that the features are not limited to the embodiments described herein. Thus, it is intended that the invention cover all such embodiments and variations. Nothing in this disclosure is intended to limit the scope of the invention in any way.

What is claimed is:

1. A spacecraft capture tug comprising:
    a frame having a first and second ends, an outer periphery, and a substantially hollow interior;
    a docking adapter disposed on the second end of the frame;
    an engagement system disposed on the first end of the frame;
    a plurality of chemical tanks disposed within the frame, at least one tank comprised of an oxidizer and one tank comprised of a propellant, each tank having an access valve for refueling in space and each tank removably secured to the frame such that a tank can be replaced in space;

a plurality of nozzles disposed on the outer periphery of the frame and each nozzle having a valve for regulating the flow of the oxidizer and fuel from the tanks, wherein the number and disposition of the nozzles can be chosen for a desired execution of orienting and propelling the tug in space;

a plurality of solar cell arrays disposed on the outer periphery of the frame and each solar cell array having a positioning system such that each array is independently pivotal in relation to the frame;

at least one battery;

a wireless communications system connected to the batteries; and a computer connected to the at least one battery, the nozzle valves, the positioning system of the solar cell arrays, the solar cell arrays, the communications system, and the computer controls charging of the batteries by the solar cell arrays, directs the flow of the oxidizer and fuel to each nozzle, controls ignition of the oxidizer and fuel combination, controls the positioning of the solar cell arrays, operates the communications system, executes avionics software, provides a status of the tug including the level of oxidizer and fuel in the tanks, operates the docking adapter and the engagement system, and implements a three axis attitude control;

wherein, power is provided to the space tug by the solar cell arrays and the computer can be accessed through a wireless communications so that the tug can be moved to a desired location in space and capture other space objects including spacecraft by way of an engagement system and provide propulsion to the captured object.

2. The spacecraft capture tug of claim 1 further comprising a harpoon like gun for attaching a cable like structure between a space object and the space capture tug.

* * * * *